United States Patent
Heo et al.

(10) Patent No.: US 11,571,960 B2
(45) Date of Patent: Feb. 7, 2023

(54) VEHICLE DRIVE DEVICE WITH REDUCTION DEVICE

(71) Applicant: SL Corporation, Daegu (KR)

(72) Inventors: Chun-Nyung Heo, Gyeongsan-si (KR);
Jae-Seung Hong, Gyeongsan-si (KR);
Min-Soo Kim, Gyeongsan-si (KR);
Mi-Rae Do, Gyeongsan-si (KR);
Sung-Jin Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 226 days.

(21) Appl. No.: 17/139,399

(22) Filed: Dec. 31, 2020

(65) Prior Publication Data

US 2021/0197655 A1    Jul. 1, 2021

(30) Foreign Application Priority Data

Dec. 31, 2019  (KR) .................. 10-2019-0179958

(51) Int. Cl.
| H02K 47/10 | (2006.01) |
| B60L 50/16 | (2019.01) |
| B60K 6/26  | (2007.10) |
| H02K 1/22  | (2006.01) |
| H02K 7/102 | (2006.01) |
| H02K 7/106 | (2006.01) |
| H02K 1/12  | (2006.01) |
| H02K 49/10 | (2006.01) |
| H02K 7/116 | (2006.01) |
| B60K 6/54  | (2007.10) |

(52) U.S. Cl.
CPC .............. *B60K 6/26* (2013.01); *B60L 50/16* (2019.02); *H02K 1/12* (2013.01); *H02K 1/22* (2013.01); *H02K 7/106* (2013.01); *H02K 7/1023* (2013.01); *H02K 49/102* (2013.01); *B60K 6/54* (2013.01); *B60L 2240/421* (2013.01); *H02K 7/116* (2013.01)

(58) Field of Classification Search
CPC .. B60K 6/26; B60K 6/54; B60L 50/16; B60L 2240/421; H02K 49/108; H02K 49/102; H02K 7/1023; H02K 7/106; H02K 7/116; H02K 1/12; H02K 1/22
USPC ...................................... 310/49.06, 103, 104
See application file for complete search history.

(56) References Cited

U.S. PATENT DOCUMENTS

| 3,405,295 A * | 10/1968 | Daley .................. F04D 13/026 310/104 |
| 2007/0181357 A1* | 8/2007 | Saito .................... B60K 7/0007 180/65.51 |
| 2012/0161497 A1* | 6/2012 | He ......................... B60L 50/30 301/6.5 |
| 2013/0094981 A1* | 4/2013 | Liang ...................... H02K 7/11 310/105 |
| 2014/0042796 A1* | 2/2014 | Park ..................... B60K 7/0007 301/6.5 |

* cited by examiner

*Primary Examiner* — Michael Andrews
(74) *Attorney, Agent, or Firm* — United One Law Group LLC; Kongsik Kim; Jhongwoo Peck

(57) ABSTRACT

A vehicle drive device with a reduction device includes an input driving unit that provides a driving force, a transmission part comprising a first rotor, a second rotor, and a stator stacked in a rotational axial direction of the input driving unit, and an output part connected to one of the first rotor or the second rotor. In particular, the input driving unit is connected to the other of the first rotor or the second rotor.

15 Claims, 5 Drawing Sheets

VEHICLE DRIVE DEVICE WITH REDUCTION DEVICE

CROSS-REFERENCE TO RELATED APPLICATIONS

This application claims priority from Korean Patent Application No. 10-2019-0179958 filed on Dec. 31, 2019, which application is incorporated herein by reference in its entirety.

BACKGROUND

1. Field of the Disclosure

The present disclosure relates to a vehicle drive device, for example, a vehicle drive device with a reduction device capable of achieving high power and the miniaturization of a transmission control device.

2. Description of the Related Art

Due to the depletion of fossil fuels, future transportation means, such as electric vehicles, that drive motors using electrical energy stored in batteries are being developed instead of vehicles using fossil fuels such as gasoline and diesel.

Electric vehicles are classified into a full electric vehicle, which drives a motor using only electrical energy stored in a rechargeable battery, a solar cell vehicle that drives a motor using photovoltaic cells, a fuel cell vehicle that drives a motor using fuel cells based on a hydrogen fuel, and a hybrid vehicle that uses both an engine and a motor by driving the engine using a fossil fuel and driving the motor using electricity.

Among the transportation means using electricity as a power source as described above, electric vehicles, plug-in hybrid cars, and fuel cell vehicles typically do not use a large single motor but use an in-wheel motor system that employs distributed control using each motor installed in each wheel.

Such an in-wheel motor system may be implemented by integrating a drive motor, a brake device, a bearing, a reducer, etc. into a wheel. Such an in-wheel motor system has technical advantages in terms of high energy efficiency compared to a system driven by one large-capacity motor, the ease of construction of an electric four-wheel drive system, and improved vehicle driving stability due to independent driving control of left and right wheels.

In general, an in-wheel motor system includes a motor that generates a driving force, a cooling device that cools the motor, a reducer that transfers the driving force of the motor to a wheel, a brake device that generates a braking force, a steering device that changes the direction of the vehicle, a suspension that supports the wheel of the vehicle, and the like, and such multiple components are integrated and arranged in the wheel. In general, an in-wheel motor system as described above converts electrical energy into a rotational driving force via a stator and a rotor of a motor, and the rotational driving force is reduced or torque is multiplied via a reducer and then transferred to a hub to rotate the wheel, such that the power is transferred in this order.

In addition, a counter gear and a planetary gear, which are contact-type reducers that are driven by a contact, have limitations in that noise and heterogeneity are generated due to the contact of the gears, there is a limit to endurance life, and lubricants should be regularly maintained to drive the contact-type gears. Further, since the motor of the in-wheel system is a single reducer, the motor becomes inoperable when the reducer fails, which causes serious vehicle problems related to driver safety. In addition, in order for a vehicle to implement a braking force, a hydraulic brake and an in-wheel motor are installed together in a limited space of a wheel, which poses a space limitation.

SUMMARY

The present disclosure is directed to providing a vehicle drive device having a reduction device capable of directly transferring the driving power of a drive motor to a wheel. The present disclosure is also directed to providing a vehicle drive device having a reduction device capable of applying an axial magnetic gear to implement non-contact speed reduction. The present disclosure is further directed to providing a vehicle drive device having a reduction device capable of allowing a sufficient arrangement space in the vehicle.

It should be noted that objects of the present disclosure are not limited to the above-described objects, and other objects of the present disclosure will be apparent to those skilled in the art from the following descriptions.

According to an aspect of an exemplary embodiment, a vehicle drive device with a reduction device may include an input driving unit that provides a driving force; a transmission part comprising a first rotor, a second rotor, and a stator stacked in a rotational axial direction of the input driving unit; and an output part coupled to one of the first rotor or the second rotor. Further, the input driving unit may be coupled to the other of the first rotor or the second rotor.

The vehicle drive device may further comprise a housing that accommodates the transmission part and the input driving unit; and a shaft that transfers the driving force of the input driving unit to the transmission part. The output part may receive the driving force of the input driving part via the shaft and may output rotation, a speed of the rotation being adjusted via the transmission part.

The transmission part may comprise an axial magnetic gear stacked in the axial direction, and the axial magnetic gear may comprise the first rotor. The first rotor may include a pole piece module being connected to an end portion of the shaft and having a harmonic modulator of magnetic material in a direction perpendicular to the axial direction.

The axial magnetic gear may further comprise the second rotor, which is formed in a disk shape, is disposed below the pole piece module, and includes a first magnet placed in the direction perpendicular to the axial direction.

Further, the axial magnetic gear may also comprise the stator, which is disposed between an upper portion of the housing and the pole piece module and includes a plurality of magnets including a second magnet placed in the direction perpendicular to the axial direction to face the pole piece module.

The first magnet may have a fewer number of poles than the second magnet, and the pole piece module may rotate at a lower rotational speed than the second rotor. The second magnet may be fixed to the housing, and the first magnet may be connected to the shaft. In particular, the axial magnetic gear may adjust the speed of the rotation of the output part with a fixed reduction ratio. The second rotor may receive the driving force of the input driving unit via the shaft, and the first rotor may be disposed between the stator and the second rotor and may be connected to the output part.

Further, the shaft may comprise a main shaft; a shaft housing bent to protrude from an upper end of the main shaft toward a bottom surface of a second housing to form a space between the shaft housing and the main shaft; and a protruding shaft provided on an upper end of the shaft housing and formed to extend from the main shaft and to protrude toward and couple to a recess formed in the output part. A bearing member may be provided at a position where the shaft and the output part are in contact with each other.

The input driving unit may comprise an input stator having a cylindrical shape and comprising a plurality of stator cores that protrude toward a center of the cylindrical shape and a plurality of coils arranged along an inner circumference of the stator cores; and an input rotor seated inside the input stator, fixedly coupled to an outer surface of the shaft housing. A third magnet corresponding to the coils may be mounted on an outer surface of the input rotor.

When the output part rotates, the input driving unit may generate electrical power by being used as a generator or by reverse driving of a motor. When the output part rotates, a predetermined braking force may be applied to the one rotor coupled to the output part by a magnetic field between the stator of the input driving unit and the other rotor to which the input driving unit is coupled. When the output part rotates, a rotational speed of the output part may be reduced by applying a holding current to the input driving unit to hold the input driving unit. When the input driving unit is held and thereby the rotational speed of the output part is reduced, the braking force may be cyclically applied in a sine wave form. The braking force of the output part may be varied by adjusting the holding current applied to the input driving unit.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 1:
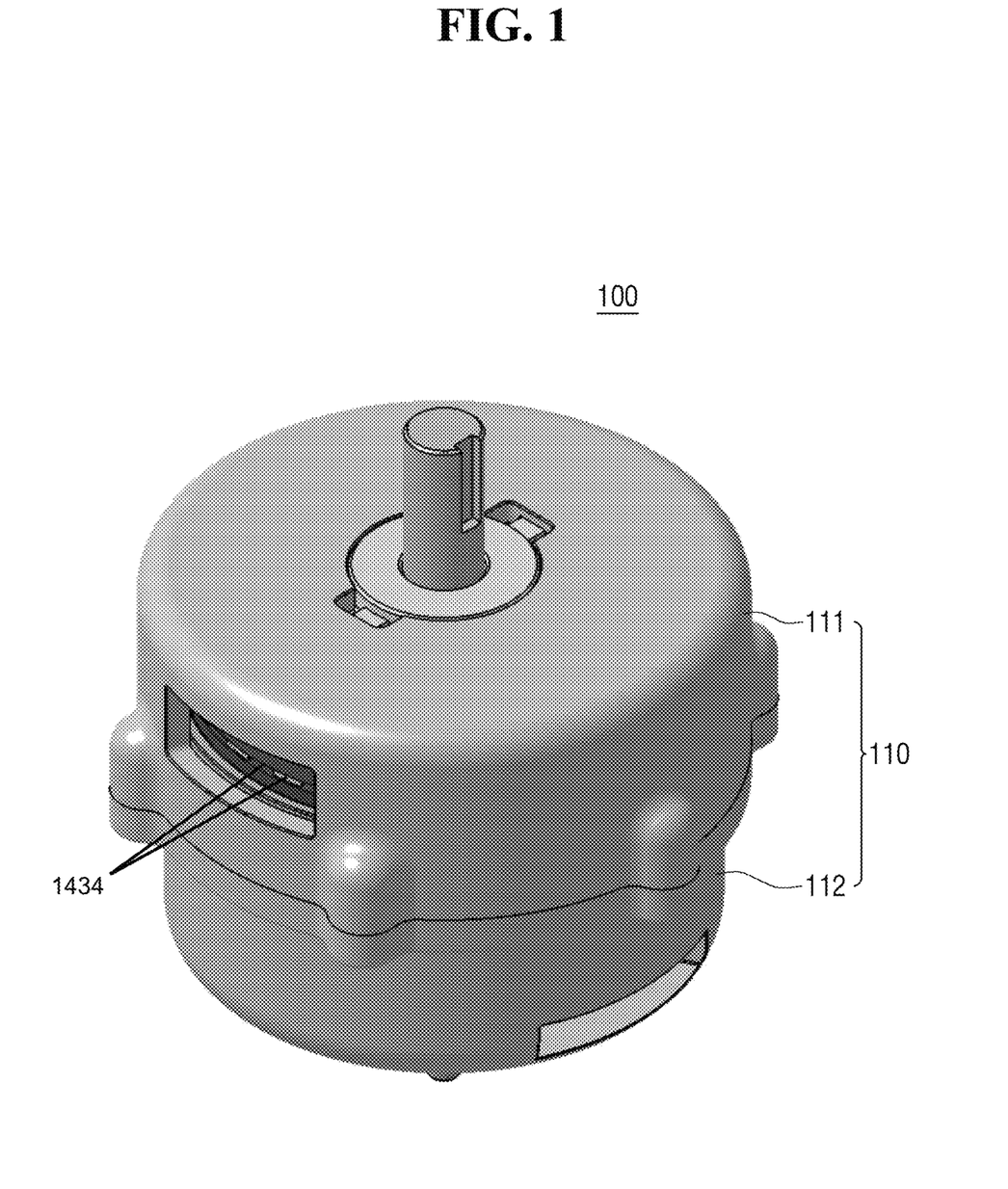
FIG. 1 is a schematic external perspective view of a vehicle drive device with a reduction device according to an exemplary embodiment of the present disclosure.
Figure 2:
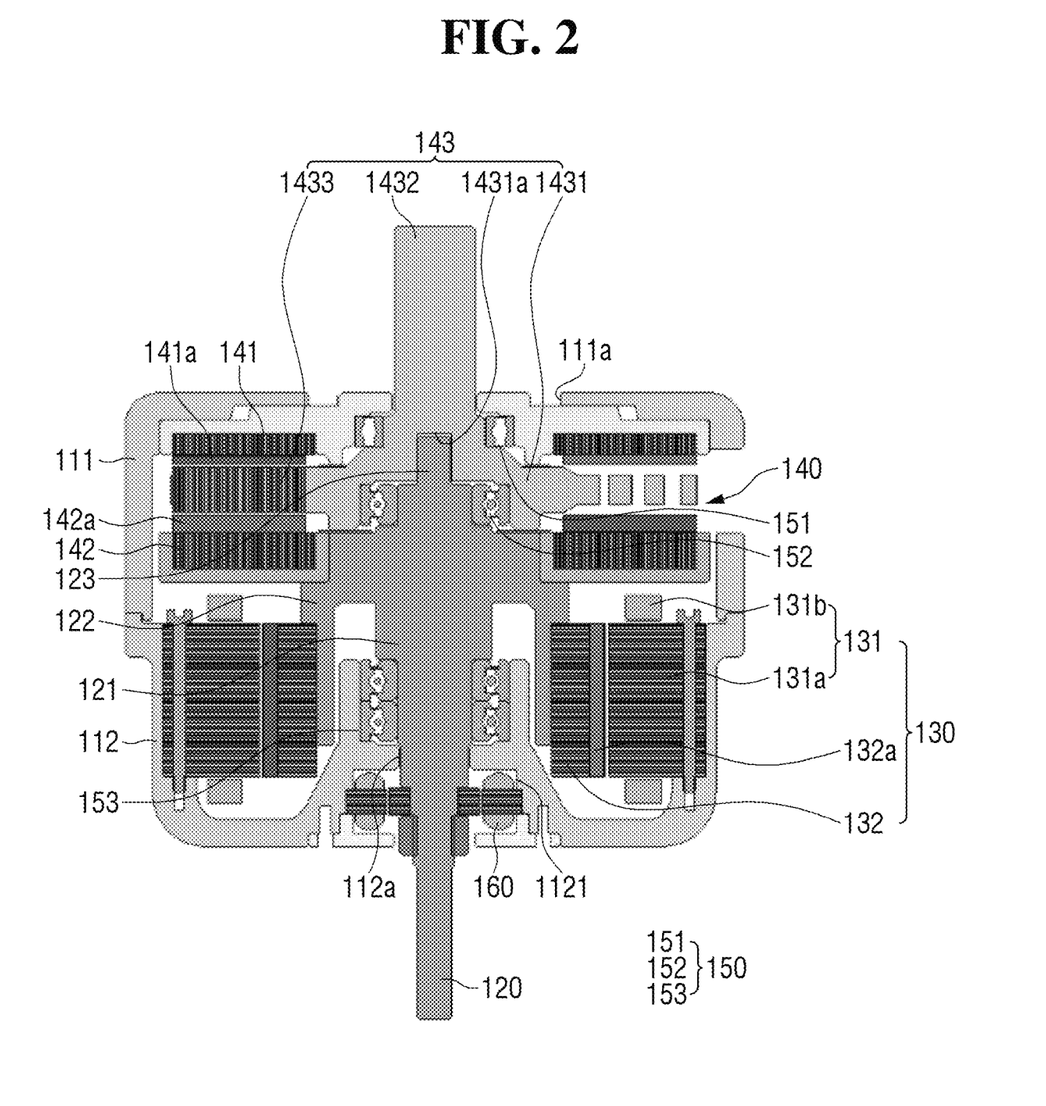
FIG. 2 is a cross-sectional view showing an internal coupling of a vehicle drive device with a reduction device according to an exemplary embodiment of the present disclosure.

FIG. 1 is a schematic external perspective view of a vehicle drive device 100 according to an exemplary embodiment of the present disclosure. FIG. 2 is a cross-sectional view showing an internal coupling of a vehicle drive device 100 according to an exemplary embodiment of the present disclosure.

Referring to FIGS. 1 and 2, the vehicle drive device 100 according to an exemplary embodiment of the present disclosure may include one drive device (e.g., an input driving unit 130, which will be described below) and one non-contact reduction device (e.g., an axial magnetic gear 140, which will be described below). The reduction device may be provided in an axial arrangement and have a fixed reduction ratio. Specifically, the vehicle drive device 100 according to an exemplary embodiment of the present disclosure may include a housing 110, a shaft 120, an input driving unit 130, and an axial magnetic gear 140.

The housing 110 may be accommodated in a wheel and may house a control driving unit that includes the shaft 120, the input driving unit 130, and the axial magnetic gear 140 therein. The housing 110 according to an exemplary embodiment of the present disclosure may be provided by combining a first housing 111 and a second housing 112.

The first housing 111 may include a bottom surface at one side and may be opened toward the second housing 112, which will be described below, to form a housing space (e.g., an accommodation space) therein for housing the control driving unit including the axial magnetic gear 140. The second housing 112 may include a bottom surface at the other side and may be opened toward the first housing 111 to form a housing space (e.g., an accommodation space) therein for housing the shaft 120 and the input driving unit 130.

A first hole 111a may be formed in the bottom surface of the first housing 111, and a second hole 112a may be formed in the bottom surface of the second housing 112 to correspond to the first hole 111a. Herein, the bottom surface of the first housing 111 and the bottom surface of the second housing 112 may not bear implication of the orientation. The bottom surfaces may face upward or sideways as well, depending on the actual installation orientation of the vehicle drive device 100.

An output protrusion 1432, which will be described below, may protrude outward from the first housing 111 through the first hole 111*a*, and a first end of the shaft 120, which will be described below, may protrude outward from the second housing 112 through the second hole 112*a*. The second hole 112*a* of the second housing 112 may be formed in a recessed surface 1121 that is drawn inward from the bottom surface of the second housing 112, and a cover for covering the recessed surface 1121 may be additionally provided.

A resolver module 160 for detecting a rotation angle of the shaft 120 protruding through the second hole 112*a* may be mounted on the recessed surface 1121. For example, a permanent magnet may be provided on an outer surface near the first end of the shaft 120 protruding through the second hole 112*a*, and a Hall sensor may be provided along the circumference of the recessed surface 1121 and spaced apart from the permanent magnet. The Hall sensor may be provided to sense the permanent magnet and detect the number of rotations of the shaft 120. In an exemplary embodiment of the present disclosure, the resolver module 160 including the permanent magnet and the Hall sensor has been described as an example. However, the present disclosure is not limited thereto. Any changes or modifications are possible, and any element may be provided around the shaft 120, which is capable of detecting a rotation angle via the rotation of the shaft 120.

The shaft 120 according to an exemplary embodiment of the present disclosure may be provided in an axial direction of the center of the housing 110. The shaft 120 may be provided up to a predetermined position of the second housing 112 through the center of the first housing 111. Specifically, the first end of the shaft 120 may be exposed outward through the second hole 112*a* of the second housing 112, and a second end of the shaft 120 may be disposed at a predetermined position inside the first housing 111.

Further, the shaft 120 according to an exemplary embodiment of the present disclosure may include a main shaft 121, a shaft housing 122, and a protruding shaft 123. The main shaft 121 may be disposed at the center of the housing 110. One end of the main shaft 121, which corresponds to the first end of the shaft 120, may protrude outward through the second hole 112*a* of the second housing 112, and the other end of the main shaft 121 may be provided at a predetermined position of the first housing 111.

The shaft housing 122 may be bent to protrude from an upper end of the main shaft 121 toward the bottom surface of the second housing 112 and may be spaced apart from the main shaft 121 to surround the main shaft 121. As a result, a space may be formed between the shaft housing 122 and the main shaft 121.

The protruding shaft 123 may protrude from an upper end of the shaft housing 122 and may extend and protrude from the main shaft 121. The protruding shaft 123 may be fitted into and coupled to a recess 1431*a* of the output protrusion 1432.

The shaft 120 may be configured to rotate together with the input driving unit 130, which will be described below, and may include a bearing member 150 to limit friction with a non-rotating portion when the shaft 120 rotates. Since the bearing member 150 may be provided not only around the shaft 120 but also around the output protrusion 1432, which will be described below, the bearing member 150 will be described in detail after the output protrusion 1432 is described.

The input driving unit 130 according to an exemplary embodiment of the present disclosure may be housed in the second housing 112 and coupled to the shaft 120. The input driving unit 130 may be provided in the axial direction, and the shaft 120 may rotate when the input driving unit 130 is driven.

The input driving unit 130 may be fitted onto the shaft 120 to rotate around the shaft 120, and the driving of the input driving unit 130 may rotate the shaft 120 and transfer the rotation to the axial magnetic gear 140, which will be described below.

The input driving unit 130 according to an exemplary embodiment of the present disclosure may include an input stator 131 and an input rotor 132. The input stator 131 may include a hollow, within which the input rotor 132, which will be described below, is configured to be mounted and may be formed in a cylindrical shape corresponding to the inner surface of the second housing 112. The input stator 131 may include a plurality of stator cores 131*a* protruding toward the center of the cylindrical shape and a plurality of coils 131*b* arranged along the inner circumference of the stator cores 131*a*.

The input rotor 132 may be seated inside the input stator 131 and formed in a cylindrical shape. The input rotor 132 may also include a hollow into which the shaft 120 is configured to be fitted. The input rotor 132 may be fixedly coupled to the shaft 120, and specifically, to the outer surface of the shaft 120, and a magnet (hereinafter referred to as a third magnet 132*a*) corresponding to the coil 131*b* may be mounted on an outer surface of the input rotor 132 along a direction parallel to the axial direction.

When an electric current is applied to the input stator 131, the input rotor 132 rotates due to the magnetic field between the coil 131*b* and the third magnet 132*a*. Along with the rotation of the input rotor 132, the shaft 120 coupled to the hollow of the input rotor 132 may also rotate. The input driving unit 130 according to an exemplary embodiment of the present disclosure may rotate at a rotational speed of 0 to 8,000 rpm depending on the driving conditions. In addition, the rotation of the shaft 120 may be transmitted to the axial magnetic gear 140, which will be described below, and more specifically, to the pole piece module 143 to allow the rotational speed of the input driving unit 130 to be reduced and output.

The axial magnetic gear 140 according to an exemplary embodiment of the present disclosure may be provided in the first housing 111, and the axial magnetic gear 140 may receive the driving power from the input driving unit 130 via the shaft 120, and subsequently control and output the received driving power at a desired rotational speed by implanting a fixed reduction ratio.

The axial magnetic gear 140 may include a stator (e.g., an output stator) 141, a rotor (e.g., an output rotor) 142, and the pole piece module 143. The pole piece module 143 may be connected to an end portion (i.e., the second end) of the shaft 120 and may include the output protrusion 1432 and a pole piece disk 1431 on which a pole piece 1433 is mounted.

The pole piece disk 1431 may be formed in the shape of a disk and may include a plurality of pole pieces 1433 that are provided, in a direction perpendicular to the axial direction, on the disk formed perpendicular to the axial direction. The pole piece module 143 may have a harmonic modulator 1434 of magnetic material in a direction perpendicular to the axial direction.

The output protrusion 1432 may protrude from the center of the pole piece disk 1431 toward the first hole 111*a* and may protrude outward from the first housing 111 through the first hole 111*a*. The recess 1431*a* that the shaft 120, specifically the protruding shaft 123, is inserted into and coupled to may be formed in a lower surface of the output protrusion 1432. The protruding shaft 123 may be fitted into the recess 1431a to allow the shaft 120 and the pole piece disk 1431 to be coupled to each other. However, since the shaft 120 and the pole piece disk 1431 are separated from each other, the rotational speeds of the shaft 120 and the pole piece module 143 may be different. In other words, the shaft 120 and the pole piece module 143 may be rotationally coupled with a relative rotation allowed therebetween.

The rotor 142 may be disposed under the pole piece module 143, and more specifically, under the pole piece disk 1431. A hole may be formed in the center of the rotor 142, and the rotor 142 may be fitted onto and fixed to an upper end of the shaft 120 through the hole. Accordingly, the rotor 143 may rotate along with the shaft 120. The rotor 142 may be formed in a disk shape, and a first magnet 142a placed in a direction perpendicular to the axial direction may be provided in the rotor 142 to face a lower surface of the pole piece module 143.

The stator 141 may be formed in a disk shape with a hole formed in the center and may be fitted onto the output protrusion 1432 through the hole. The stator 141 may be disposed between the pole piece disk 1431 and the bottom surface of the first housing 111 and may include a second magnet 141a placed in a direction perpendicular to the axial direction and in a direction opposite to the pole piece 1433.

As described above, the axial magnetic gear 140 may be stacked in the axial direction, and in this case, the rotor 142, the first magnet 142a, the pole piece disk 1431, the second magnet 141a, and the stator 141 may be sequentially stacked in the axial direction going from the bottom toward the top.

Accordingly, the axial magnetic gear 140 may receive the rotation of the input driving unit 130 and output the rotation while achieving a constant fixed reduction ratio between the first magnet 142a and the second magnet 141a. In the following description, as an example, the pole piece module 143 according to an exemplary embodiment of the present disclosure may rotate at a speed of 0 to 1000 rpm.

The first magnet 142a may include a smaller number of poles than the second magnet 141a, and the pole piece module 143 may rotate at a lower speed than the rotor 142. As described above, the axial magnetic gear 140 of the present disclosure has a fixed reduction ratio, and the fixed reduction ratio of the axial magnetic gear 140 may be set to 7.00 to 8.00. In other words, the axial magnetic gear 140 may be implemented such that the rotor 142 receives an input, the stator 141 controls, and the pole piece module 143 outputs.

Further, since the shaft 120 and the output protrusion 1432 are rotationally coupled, a bearing member 150 may be provided to increase durability and decrease friction with a non-rotating structure being in contact with the shaft 120 and the output protrusion 1432. Specifically, the bearing member 150 may be provided at a position where the shaft 120 and the output protrusion 1432 are brought into contact with each other. For example, the bearing member 150 according to an exemplary embodiment of the present disclosure may include a first bearing 151, a second bearing 152, and a third bearing 153.

The first bearing 151 may be disposed between the output protrusion 1432 and the first hole 111a of the first housing 111. Accordingly, the first bearing 151 may reduce friction between the first housing 111 and the output protrusion 1432 during the rotation.

The second bearing 152 may be provided between the protruding shaft 123 and the recess 1431a of the output protrusion 1432. Accordingly, the second bearing 152 may reduce the occurrence of frictional contact between the protruding shaft 123 and the output protrusion 1432 during the rotation.

The third bearing 153 may be provided between the main shaft 121 and the second hole 112a. Accordingly, when the main shaft 121 rotates (i.e., when the shaft 120 rotates), the third bearing 153 may reduce the occurrence of frictional contact between the main shaft 121 and the second hole 112a.

Figure 3:
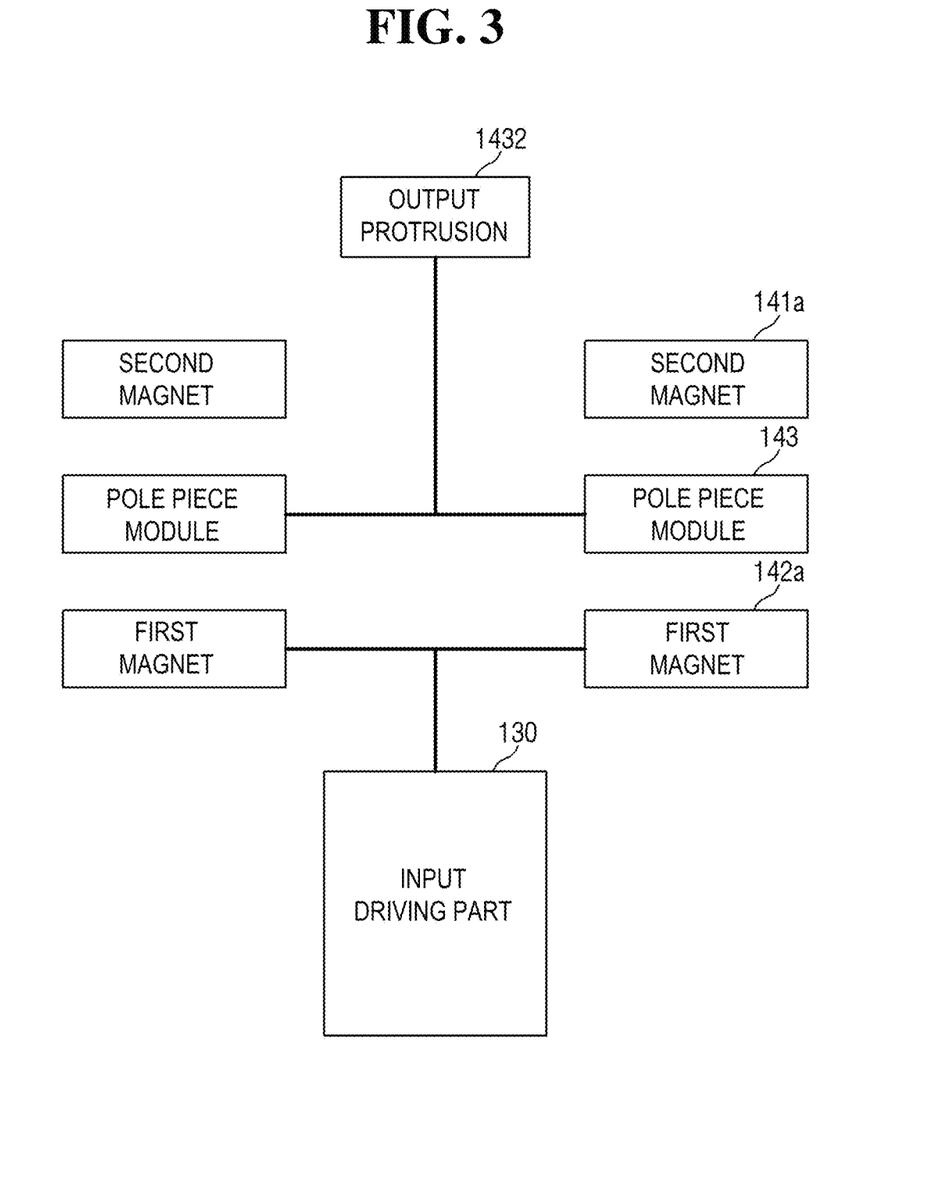
FIG. 3 schematically shows an example of connection between an input driving unit and an output part in a vehicle drive device with a reduction device according to an exemplary embodiment of the present disclosure.
Figure 4:
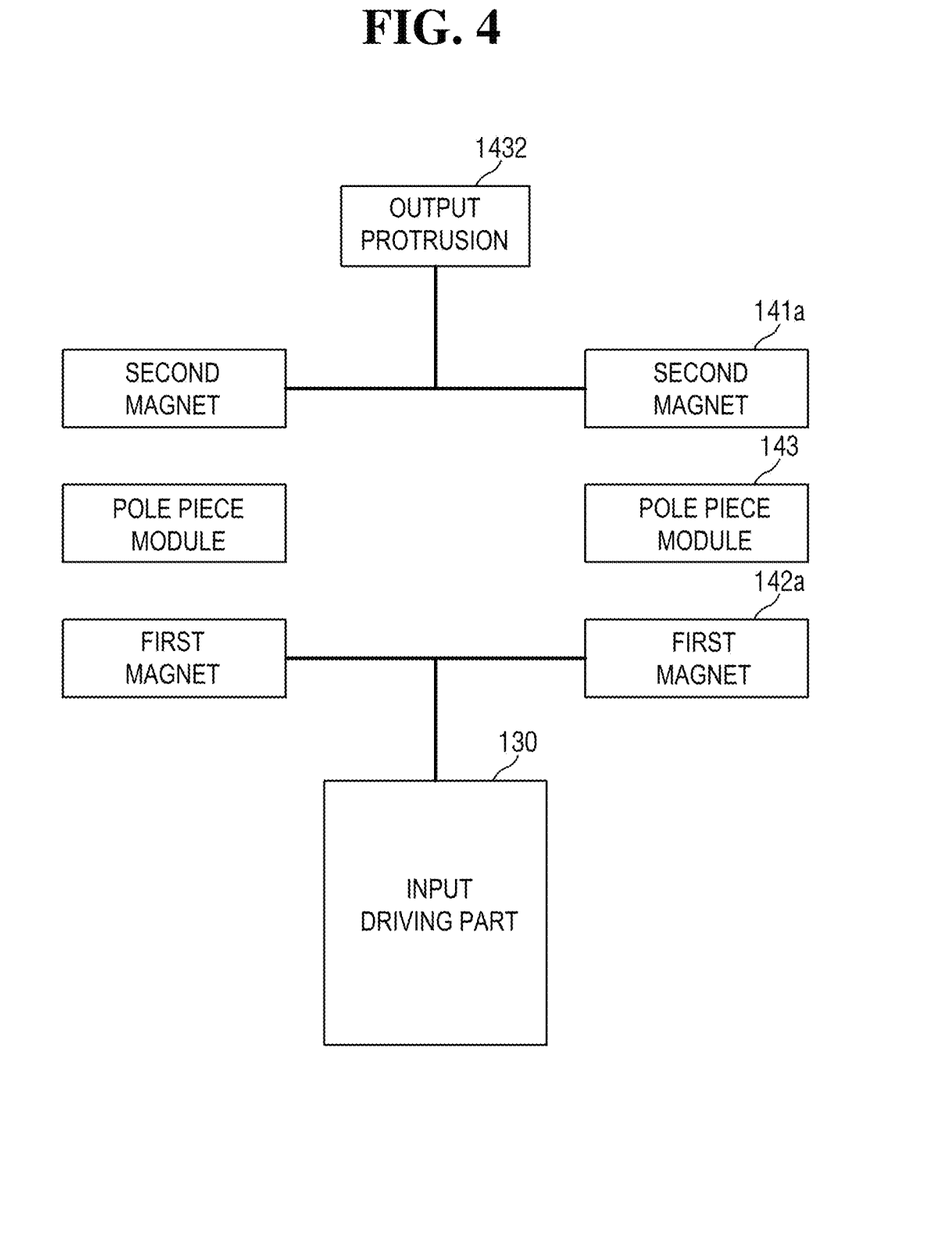
FIG. 4 schematically shows another example of connection between an input driving unit and an output part in a vehicle drive device with a reduction device according to an exemplary embodiment of the present disclosure.
Figure 5:
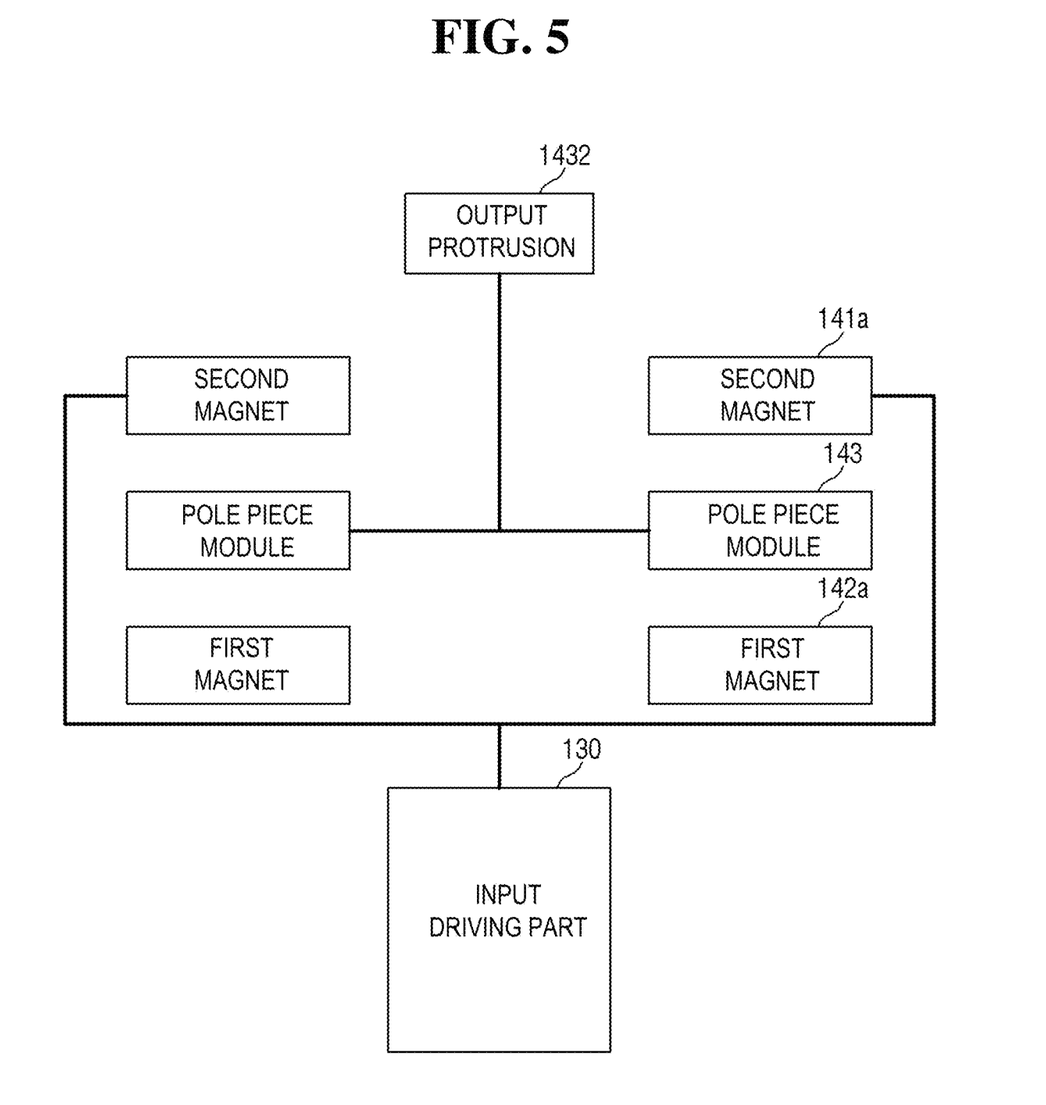
FIG. 5 schematically shows another example of connection between an input driving unit and an output part in a vehicle drive device with a reduction device according to an exemplary embodiment of the present disclosure.

FIG. 3 schematically shows an example of connection between the input driving unit 130 and the output protrusion 1432 in the vehicle drive device 100 with a reduction device according to an exemplary embodiment of the present disclosure. FIG. 4 schematically shows another example of connection between the input driving unit 130 and the output protrusion 1432 in the vehicle drive device 100 with a reduction device according to an exemplary embodiment of the present disclosure. FIG. 5 schematically shows another example of connection between the input driving unit 130 and the output protrusion 1432 in the vehicle drive device 100 with a reduction device according to an exemplary embodiment of the present disclosure.

Referring to FIGS. 3 and 4, the coupling relationships between the input driving unit 130, the output protrusion 1432, the first magnet 142a, the pole piece module 143, and the second magnet 141a can be checked.

First, in the vehicle drive device 100 with the reduction device having the coupling relationship as shown in FIG. 3, the second magnet 141a may be fixed, and the input driving unit 130 may be connected to the first magnet 142a and may transfer the driving force. Also, the output protrusion 1432 may be connected to the pole piece module 143 and may output a rotational speed reduced by a predetermined ratio by the pole piece module 143.

The input driving unit 130 may generate electrical power as being used as a generator or by reverse driving of a motor. When the output protrusion 1432 rotates, the pole piece module 143 connected to the output protrusion 1432 may rotate by receiving the rotational force of the output protrusion 1432. The input driving unit 130 may be driven by the rotation of the pole piece module 143 to generate electrical power.

The input driving unit 130 may be fixed by applying a holding current to the input driving unit 130. When the input driving unit 130 is fixed, the rotation of the first magnet 142a may be fixed, and a magnetic field may be formed between the second magnet 141a and the pole piece module 143. In this case, when the output protrusion 1432 rotates due to the rotation of a wheel, the pole piece module 143 may rotate between the second magnet 141a and the first magnet 142a. In such case, a slip torque may be produced due to a magnetic field generated through the rotation of the pole piece module 143 between the second magnet 141a and the first magnet 142a, which may act as a braking force. For example, the braking force may be cyclically applied in a sine wave form.

The rotational speed of the output protrusion 1432 may be decreased by this braking force. Also, to vary the braking force, the rotational speed of the output protrusion 1432 may be decreased by controlling a holding current acting on the input driving unit 130.

In a vehicle drive device having the above-described reduction device, the description with regards to the case where the input driving unit 130 is driven as a generator and the braking force is produced due to a holding current may be similarly applied to the structure shown in FIG. 4.

In the vehicle drive device 100 with the reduction device having the coupling relationship shown in FIG. 4, the pole piece module 143 may be fixed, and the input driving unit 130 may be connected to the first magnet 142*a* to transfer the driving force. Also, the output protrusion 1432 may be connected to the second magnet 141*a* and may output a rotational speed reduced by a predetermined reduction ratio.

In the vehicle drive device 100 with the reduction device having the coupling relationship as shown in FIG. 5, the first magnet 142*a* may be fixed, and the input driving unit 130 may be connected to the second magnet 141*a* to transfer the driving force. Also, the output protrusion 1432 may be connected to the pole piece module 143 and may output a rotational speed reduced by a predetermined reduction ratio.

As described above, in the vehicle drive device 100 with the reduction device, each of the input driving unit 130 and the output protrusion 1432 may be connected to one of the second magnet 141*a*, the first magnet 142*a*, and the pole piece module 143. Also, among the second magnet 141*a*, the first magnet 142*a*, and the pole piece module 143, the remaining component that is connected to neither the input driving unit 130 nor the output protrusion 1432 may be fixed.

As described above, the vehicle drive device 100 can directly transfer necessary output power corresponding to the driving conditions to the wheels using the input driving unit 130 and the axial magnetic gear 140, and thus, can improve durability and reduce noise.

As described above, the vehicle drive device having the reduction device according to an exemplary embodiment of the present disclosure may provide a fixed reduction ratio, due to the operations of the input driving unit and the axial magnetic gear included in the control driving unit. Therefore, the vehicle drive device may be designed with a smaller volume relatively to the output torque, and it may save an arrangement space, achieve weight-reduction and miniaturization, and improve flexibility in space utilization.

Further, with the vehicle drive device with the reduction device according to an exemplary embodiment of the present disclosure, the speed reduction may be achieved in a non-contact manner due to the axial magnetic gear. Accordingly, it may improve durability and also decrease noise and heterogeneity.

Many modifications and other embodiments of the disclosure will become apparent to one skilled in the art having the benefit of the teachings presented in the foregoing descriptions and the associated drawings. Therefore, it is understood that the disclosure is not to be limited to the specific exemplary embodiments disclosed, and that modifications and other embodiments are intended to be included within the scope of the appended claims.

What is claimed is:

1. A vehicle drive device, comprising:
   an input driving unit that provides a driving force;
   a transmission part comprising a first rotor, a second rotor, and a stator that are stacked in a rotational axial direction of the input driving unit;
   a shaft that transfers the driving force of the input driving unit to the transmission part:
   an output part that receives the driving force of the input driving part via the shaft and outputs rotation, wherein a speed of the rotation is adjusted via the transmission part; and
   a housing that accommodates the transmission part and the input driving unit,
   wherein the output part is coupled to one of the first rotor or the second rotor, and the input driving unit is coupled to the other of the first rotor or the second rotor,
   wherein the first rotor includes a pole piece module, and
   wherein the stator is disposed between an upper portion of the housing and the pole piece module of the first rotor.

2. The vehicle drive device of claim 1,
   wherein the pole piece module is connected to an end portion of the shaft and includes a harmonic modulator of magnetic material arranged in a direction perpendicular to the axial direction.

3. The vehicle drive device of claim 2,
   wherein the second rotor is formed in a disk shape, is disposed below the pole piece module, and includes a first magnet placed in the direction perpendicular to the axial direction.

4. The vehicle drive device of claim 3,
   wherein the stator includes a plurality of magnets including a second magnet placed in the direction perpendicular to the axial direction to face the pole piece module.

5. The vehicle drive device of claim 4, wherein the first magnet has a fewer number of poles than the second magnet, and
   wherein the pole piece module rotates at a lower rotational speed than the second rotor.

6. The vehicle drive device of claim 4, wherein the second magnet is fixed to the housing, and the first magnet is connected to the shaft, and
   wherein the transmission part adjusts the speed of the rotation of the output part by a fixed reduction ratio.

7. The vehicle drive device of claim 1, wherein the second rotor receives the driving force of the input driving unit via the shaft, and
   wherein the first rotor is disposed between the stator and the second rotor, and is connected to the output part.

8. The vehicle drive device of claim 7, wherein the shaft comprises:
   a main shaft;
   a shaft housing bent to protrude from an upper end of the main shaft toward a bottom surface of a second housing to form a space between the shaft housing and the main shaft; and
   a protruding shaft provided on an upper end of the shaft housing and formed to extend from the main shaft and to protrude toward and couple to a recess formed in the output part.

9. The vehicle drive device of claim 8, further comprising a bearing member disposed at a position where the shaft and the output part are in contact with each other.

10. The vehicle drive device of claim 8, wherein the input driving unit comprises:
    an input stator having a cylindrical shape and comprising a plurality of stator cores that protrude toward a center of the cylindrical shape and a plurality of coils arranged along an inner circumference of the stator cores; and
    an input rotor seated inside the input stator, fixedly coupled to an outer surface of the shaft housing,
    wherein a third magnet corresponding to the coils is mounted on an outer surface of the input rotor.

11. The vehicle drive device of claim 1, wherein when the output part rotates, the input driving unit generates electrical power by being used as a generator or by reverse driving of a motor.

12. The vehicle drive device of claim 11, wherein when the output part rotates, a predetermined braking force is applied to the one rotor coupled to the output part by a magnetic field between the stator of the input driving unit and the other rotor to which the input driving unit is coupled.

13. The vehicle drive device of claim 1, wherein when the output part rotates, a rotational speed of the output part is reduced by applying a holding current to the input driving unit to hold the input driving unit.

14. The vehicle drive device of claim 13, when the input driving unit is held and thereby the rotational speed of the output part is reduced, the braking force is cyclically applied in a sine wave form.

15. The vehicle drive device of claim 14, wherein the braking force of the output part is varied by adjusting the holding current applied to the input driving unit.

* * * * *